(12) United States Patent
Soni et al.

(10) Patent No.: US 12,490,081 B2
(45) Date of Patent: Dec. 2, 2025

(54) METHOD, SYSTEM AND COMPUTER PROGRAM PRODUCT WITH GEOFENCING FEATURES

(71) Applicant: RAKUTEN SYMPHONY, INC., Tokyo (JP)

(72) Inventors: Naredra Soni, Madhya Pradesh (IN); Rajat Mehra, Madhya Pradesh (IN); Sujata Patil, Madhya Pradesh (IN); Kuldeep Solanki, Madhya Pradesh (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 17/760,450

(22) PCT Filed: Jun. 17, 2022

(86) PCT No.: PCT/US2022/033914
§ 371 (c)(1),
(2) Date: Aug. 10, 2022

(87) PCT Pub. No.: WO2023/244240
PCT Pub. Date: Dec. 21, 2023

(65) Prior Publication Data
US 2024/0187842 A1    Jun. 6, 2024

(51) Int. Cl.
*H04W 8/22*    (2009.01)
*H04W 64/00*    (2009.01)

(52) U.S. Cl.
CPC ............. *H04W 8/22* (2013.01); *H04W 64/00* (2013.01)

(58) Field of Classification Search
CPC .......... H04W 8/22; H04W 8/24; H04W 64/00
See application file for complete search history.

(56) References Cited

U.S. PATENT DOCUMENTS

| | | |
|---|---|---|
| 2013/0090969 A1 | 4/2013 | Rivere |
| 2014/0195295 A1 | 7/2014 | Whitley et al. |
| 2017/0135139 A1* | 5/2017 | Laghaeian ............ H04W 4/029 |
| 2018/0248891 A1* | 8/2018 | Tamma ................... H04L 67/52 |

\* cited by examiner

*Primary Examiner* — Wayne H Cai
(74) *Attorney, Agent, or Firm* — HAUPTMAN HAM, LLP

(57) ABSTRACT

A mobile terminal receives a task to be performed using the mobile terminal, the task associated with a site. The mobile terminal determines whether the mobile terminal is within a predetermined area containing the site. In response to determining that the mobile terminal is not within the predetermined area containing the site, the mobile terminal disables the task from being performed using the mobile terminal. In response to determining that the mobile terminal is within the predetermined area containing the site, the mobile terminal enables the task to be performed using the mobile terminal.

20 Claims, 13 Drawing Sheets 300A (300)

≡ Administration  Mobile Configuration

| Module Name | Site | Radius (m) | Type | Action |
|---|---|---|---|---|
| RFI-B | ZBDG_6334 JBA_M_01830 | 350 | Site | ooo |
| TSSR | ZSMG2_0198 JTE_M_02985 | 130 | Site | ooo |
| TSSR | ZSMG2_0159 JTE_M_02902 | 105 | Site | ooo |
| LOS Microwave | ZBDG_6336 JBA_M_01867 | 700 | Site | ooo |
| RFI-B | ZBDG_6336 JBA_M_01867 | 700 | Site | ooo |
| TSSR | ZYKT_2438 DIY_M_00443 | 180 | Site | ooo |
| TSSR | ZSMG2_0157 JTE_M_02900 | 158 | Site | ooo |
| TSSR | ZBDG_6336 JBA_M_01867 | 700 | Site | ooo |

301 → RFI-B
302 → TSSR
303 → TSSR
304 → LOS Microwave
305 → RFI-B
306 → TSSR
307 → TSSR 316 Module Name, 312 Site, 314 Radius (m), 323 Type, 328 Action, 350, 351

FIG. 3A

Create Mobile Configuration

Type* — 353
[ Site ▷ ]

Module Name* — 356
[ Installation ▷ ]

Radius (m)* — 354
[ 10000000000 ]
11/15

Site Id* — 352
[ ✕ ZIBDG_5031 ]

357 → CANCEL  358 → ADD

FIG. 3B

| Module Name | Site | Radius (m) | Type | Action |
|---|---|---|---|---|
| Installation | ZIBDG_5031<br>ZIBDG_5031 | 10000000000 | Site | ooo |
| Installation | ZBDG_5116<br>ZTE_0797 | 10000000000 | Site | ooo |
| Installation | — | 50 | Application | ooo |
| LOS Microwave | ZBDG_5116<br>ZTE_0797 | 1000000 | Site | ooo |
| LOS Microwave | ZBJM_0869<br>SLB_M_00360 | 125000 | Site | ooo |
| LOS Microwave | ZBJM_0860<br>SLU_M_00118 | 130000 | Site | ooo |
| LOS Microwave | ZJKT_4176<br>ZJKT_4176 | 740000 | Site | ooo |
| | ZJKT2_4001 | | | |

FIG. 3C

METHOD, SYSTEM AND COMPUTER PROGRAM PRODUCT WITH GEOFENCING FEATURES

RELATED APPLICATIONS

The present application is a National Phase of International Application No. PCT/US2022/033914, filed Jun. 17, 2022.

TECHNICAL FIELD

The instant application is related to task management.

BACKGROUND

In various industries, services, systems, or the like, there are situations where some activities need to be performed in the field at a physical location of a site where equipment and/or services are to be provided. Ensuring that the required activities are performed at the correct site or location is a consideration.

SUMMARY

In some embodiments, a method for task management comprises receiving, by a mobile terminal, a task to be performed using the mobile terminal, the task associated with a site. The mobile terminal determines whether the mobile terminal is within a predetermined area containing the site. In response to determining that the mobile terminal is not within the predetermined area containing the site, the mobile terminal disables the task from being performed using the mobile terminal. In response to determining that the mobile terminal is within the predetermined area containing the site, the mobile terminal enables the task to be performed using the mobile terminal.

In some embodiments, a system for task management comprises at least one processor, and at least one memory coupled to the at least one processor and configured to store executable instructions. The executable instructions, when executed by the at least one processor, cause the at least one processor to maintain a database comprising a plurality of sites each of which is associated with an editable radius and at least one task to be performed. The at least one processor is caused to transmit, to a mobile terminal, a task to be performed using the mobile terminal, the site associated with the task, and the radius associated with the site. The mobile terminal is caused to determine whether the mobile terminal is within the radius from the site, disable the task from being performed using the mobile terminal in response to determining that the mobile terminal is not within the radius from the site, and enable the task to be performed using the mobile terminal in response to determining that the mobile terminal is within the radius from the site.

In some embodiments, a computer program product for task management comprises a non-transitory, tangible computer readable storage medium storing a computer program that, when executed by at least one processor, causes the at least one processor to visually present a list of tasks to be performed at corresponding sites using a mobile terminal. In response to user selection of a task from the list, the at least one processor is caused to determine whether the mobile terminal is within a predetermined radius from the site corresponding to the selected task. In response to determining that the mobile terminal is not within the radius from the corresponding site, the at least one processor is caused to disable the selected task from being performed using the mobile terminal. In response to determining that the mobile terminal is within the radius from the corresponding site, the at least one processor is caused to enable the selected task to be performed using the mobile terminal.

BRIEF DESCRIPTION OF THE DRAWINGS

Aspects of the present disclosure are best understood from the following detailed description when read with the accompanying figures. In accordance with the standard practice in the industry, various features are not drawn to scale. In fact, the dimensions of the various features be arbitrarily increased or reduced for clarity of discussion.

FIGS. 3A-3C are schematic diagrams of various screens of a graphical user interface (GUI) at a task management system, in accordance with some embodiments.

DETAILED DESCRIPTION

Figure 1A:
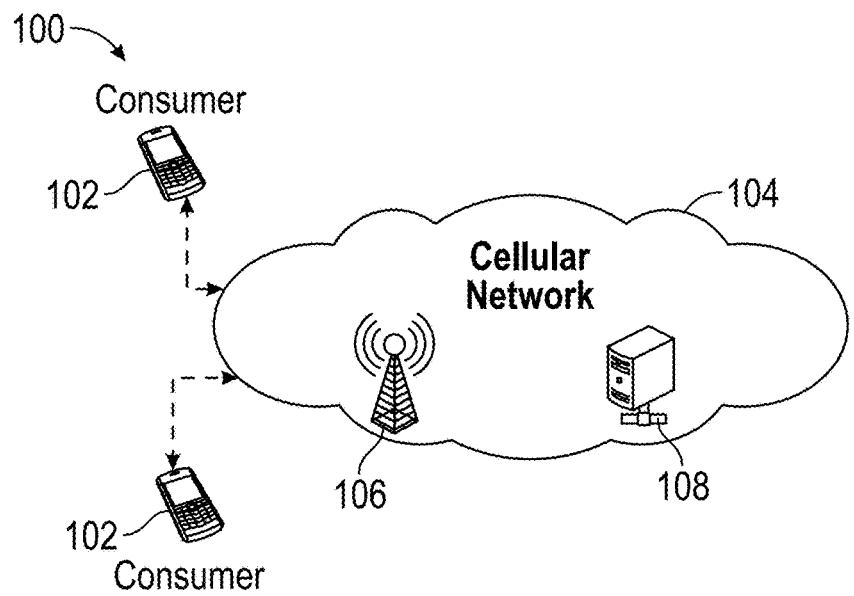
FIG. 1A is a schematic diagram of a communications network, in accordance with some embodiments.

The following disclosure includes many different embodiments, or examples, for implementing different features of the subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows include embodiments in which the first and second features are formed in direct contact, and also include embodiments in which additional features be formed between the first and second features, such that the first and second features not be in direct contact. In addition, the present disclosure repeats reference numerals and/or letters in the various examples. This repetition is for the purpose of simplicity and clarity and does not in itself dictate a relationship between the various embodiments and/or configurations discussed. Further, spatially relative terms, such as "beneath," "below," "lower," "above," "upper" and the like, be usable herein for ease of description to describe one element or feature's relationship to another element(s) or feature(s) as illustrated in the FIGS. The spatially relative terms are intended to encompass different orientations of the device in use or operation in addition to the orientation depicted in the FIGS. The apparatus be otherwise oriented (rotated 90 degrees or at other orientations) and the spatially relative descriptors usable herein likewise be interpreted accordingly.

In some situations, when one or more activities need to be performed in the field at a physical location of a site where equipment and/or services are to be provided, there is a concern that the required activities may not be performed at a the correct site. An example involves the rollout of a network or facilities where some activities need to be performed in the field at an actual site. However, there might be chances that the field engineer (or operator or technician) does not perform the required activities at the actual site, e.g., the field engineer may deliberately or inadvertently capture data at an incorrect location which potentially leads to subsequent fraudulent and/or incorrect activities or operations.

In some embodiments, to avoid, or at least reduce the likelihood of, activities or tasks being performed at incorrect locations, geofencing features are included in a system for task management. In at least one embodiment, a radius is predetermined for each site where a task is to be performed using a mobile terminal. The mobile terminal determines whether the mobile terminal is located within the predetermined radius from the site. When the mobile terminal is determined to be located within the predetermined radius from the site, the task is enabled to be performed using the mobile terminal. For example, a user of the mobile terminal (e.g., a field engineer or technician) may use the mobile terminal to capture data or images, and/or to enter data captured by other equipment. When the mobile terminal is determined to be located outside the predetermined radius from the site, the task is disabled from being performed using the mobile terminal. For example, the mobile terminal does not permit the user of the mobile terminal to use the mobile terminal to capture data or images, and/or to enter data captured by other equipment. As a result, in at least one embodiment, the user will not be able to use the mobile terminal to perform the required task unless and until the mobile terminal is within the predetermined radius from the site, i.e., within an acceptable or predetermined vicinity of the site. Accordingly, it is possible, in one or more embodiments, to prevent incorrect and/or fraudulent activities from being performed at an incorrect location. Other features and/or advantages are within the scopes of various embodiments.

FIG. 1A is a schematic diagram of a communications network 100, in accordance with some embodiments. The communications network 100 is an example where one or more methods, systems and/or computer program products with geofencing features in accordance with some embodiments are applicable. Other fields, industries, applications, services, or the like, in which one or more methods, systems and/or computer program products with geofencing features described herein are usable, are within the scopes of various embodiments.

In the example in FIG. 1A, consumers' mobile terminals 102 are coupled to a cellular network 104 to receive communication services. In an example, the cellular network 104 comprises a plurality of cells (not shown) in which cellular services are provided, through corresponding base stations. A representative base station 106 is illustrated in FIG. 1A. The base stations constitute a radio access network, and are coupled to a core network of the cellular network 104. A representative network device 108 of the core network is illustrated in FIG. 1A. Examples of the cellular network 104 include, but are not limited to, a long term evolution (LTE) network, a fifth generation (5G) network, a non-standalone (NSA) network, a standalone (SA) network, a global system for mobile communications (GSM) network, a general packet radio service (GPRS) network, a code-division multiple access (CDMA) network, a Mobitex network, an enhanced GPRS (EDGE) cellular network, or the like. Example configurations of the base stations include cell towers each having one or more cellular antennas, one or more sets of transmitter/receivers transceivers, digital signal processors, control electronics, a Global Positioning System (GPS) receiver for timing (e.g., for CDMA2000/IS-95 or GSM systems), primary and backup electrical power sources, and sheltering. Examples of mobile terminals 102, include, but are not limited to, cell phones, tablets, media players, gaming consoles, personal data assistants (PDAs), laptops, and other electronic devices configured to transmit and/or receive cellular communication to/from the base stations of the cellular network 104. An example hardware configuration of a mobile terminal and/or a base station includes a computer system described with respect to FIG. 7, with the addition of one or more cellular antennas and corresponding cellular transceiving circuitry. Examples of communication technologies for performing cellular communications between base stations and mobile terminals include, but are not limited to, 2G, 3G, 4G, 5G, GSM, EDGE, WCDMA, HSPA, CDMA, LTE, DECT and WiMAX. Examples of services provided over cellular communication, herein referred to as cellular communication services, include, but are not limited to, voice calls, data, emails, messages such as SMS and MMS, applications, and control signals. Example components (or network devices 108) of the core network include, but are not limited to, serving gateways (SGW), high rate packet data serving gateway (HSGW), packet data network gateway (PGW), packet data serving node (PDSN), mobility management entity (MME), home subscriber server (HSS), and policy control rules function (PCRF). The components of the core network are coupled with each other and with the base stations by one or more public and/or proprietary networks. An example hardware configuration of a component or network device 108 of the core network includes a computer system described with respect to FIG. 7.

Figure 1B:
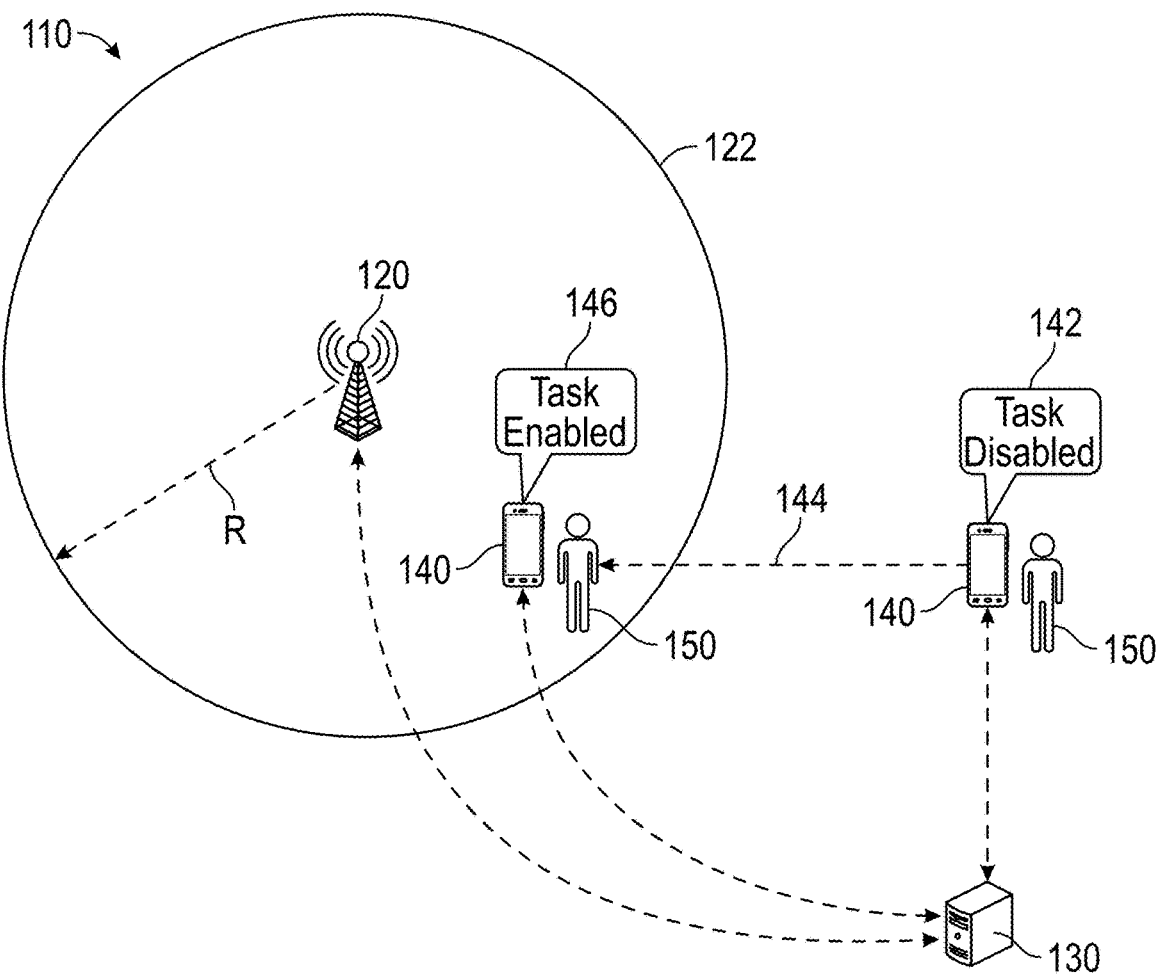
FIG. 1B is a schematic diagram of a section of a communications network, in accordance with some embodiments.

FIG. 1B is a schematic diagram of a section 110 of the communications network 100, in accordance with some embodiments.

The section 110 comprises a site 120 for which one or more tasks are to be performed by using a mobile terminal. Specifically, a task management system or server 130 is provided for managing tasks to be performed at various sites, including the site 120, in the communications network 100. The server 130 is configured to instruct, through a mobile terminal 140, a user 150 of the mobile terminal 140 to visit the site 120 to perform one or more tasks associated with the site 120 by using the mobile terminal 140. For simplicity, one mobile terminal 140 and one corresponding user 150 are illustrated in FIG. 1B. However, any other numbers of mobile terminals and corresponding users (e.g., field engineers or technicians) are encompassed in one or more embodiments.

In FIG. 1B, the site 120 comprises a base station. This is just an example. Other types of sites are within the scopes of various embodiments. In some embodiments, for a communications network such as the communications network 100, a site comprises any equipment of the communications network, such as antenna, cell tower, base station, network device, or the like. In one or more embodiments, for any fields, industries, applications, services, a site comprises any physical location where equipment or services are provided and where one or more tasks are to be performed with respect to the provided equipment or services.

A task to be performed at a site varies depending on one or more aspects, configurations or characteristics of the site. As non-limiting examples, tasks that the user 150 may perform using the mobile terminal 140 include, but are not limited to, surveying a physical site for installing a base station, checking operations of various equipment at a base station or a network device, or the like. In at least one embodiment, a task comprises data capture and/or data entry. For example, a task requires the user 150 to perform one or more of capturing at least one image, performing at least one measurement using the mobile terminal 140 or another measuring equipment, entering the captured images and/or data manually or with automated or computerized tools into a form (e.g., a table) provided by the mobile terminal 140. In at least one embodiment, a task is represented by or corresponds to a module, app or software which, when executed by the mobile terminal 140, presents the user 150 with steps or operations to be performed and/or a form for data entry.

Figure 7:
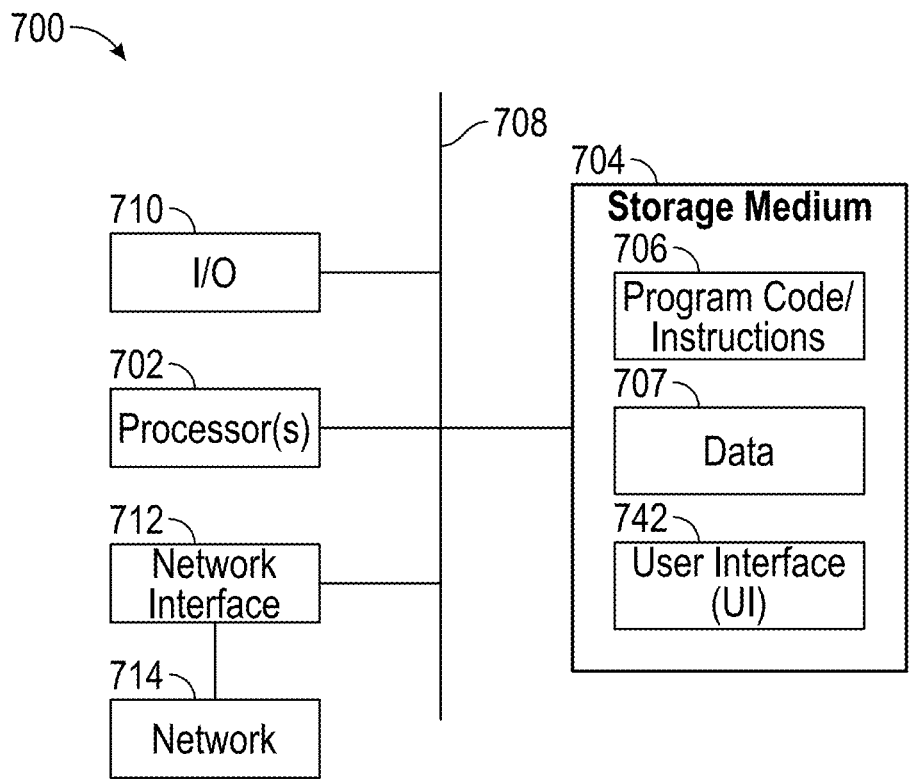
FIG. 7 is a schematic block diagram of a computer system, in accordance with some embodiments.

An example hardware configuration of the server 130 includes a computer system described with respect to FIG. 7. Examples of the mobile terminal 140 include, but are not limited to, cell phones, tablets, personal data assistants (PDAs), laptops, and other electronic devices with network capability. An example hardware configuration of the mobile terminal 140 includes a computer system described with respect to FIG. 7, with the addition of one or more cellular antennas and corresponding cellular transceiving circuitry. In some embodiments, the server 130 is configured to communicate with the site 120 by a core network, as described herein. In at least one embodiment, the server 130 is configured to wirelessly communicate with the mobile terminal 140 via a wireless network, as described herein.

In some embodiments, the server 130 is configured to maintain a database comprising a plurality of sites each of which is associated with an editable radius and at least one task to be performed. An example database maintained by the server 130 is described with respect to FIG. 2. The server 130 is configured to set, or receive user input of, a radius R for the site 120. The radius R defines a circle 122 around a center (not numbered) corresponding to a physical location of the site 120. In some embodiments, the physical location of the site 120 is presented by the longitude and latitude of the site 120. Other configurations for defining or indicating the physical location of the site 120 are within the scopes of various embodiments. The radius R is enterable or editable by a user at the server 130, e.g., through a GUI visually presented by the server 130. An example GUI for entering or modifying the radius R is described with respect to FIGS. 3A-3C. Other configurations for entering or modifying the radius R are within the scopes of various embodiments.

The server 130 is configured to transmit to the mobile terminal 140 a task to be performed using the mobile terminal 140, the site 120 associated with the task, and the radius R associated with the site 120. The mobile terminal 140 is configured to determine whether the mobile terminal 140 is within the radius R from the site 120. In other words, the mobile terminal 140 determines whether the mobile terminal 140 is physically within the circle 122. The physical location of the site 120 is transmitted from the server 130 to the mobile terminal 140, or is built in or pre-downloaded to, the mobile terminal 140. The mobile terminal 140 is configured to determine its own physical location, e.g., by using a GPS receiver included in the mobile terminal 140. In some embodiments, the physical location of the mobile terminal 140 is presented by the longitude and latitude of the mobile terminal 140. Based on the physical locations of the site 120 and the mobile terminal 140, the mobile terminal 140 is configured to determine a physical distance between the mobile terminal 140 and the site 120. An example Equation (1) for determining the distance d between the mobile terminal 140 and the site 120 is given below:

$$d = 6371000 \times a\ \cos(\cos(uLa) \times \cos(sLa) \times \cos(sLo - uLo) + \sin(uLa) \times \sin(sLa)) \quad (1)$$

where 6371000 is the radius of the Earth (in meters), uLa is the latitude of the mobile terminal 140 (in radians), uLo is the longitude of the mobile terminal 140 (in radians), sLa is the latitude of the site 120 (in radians), and sLo is the longitude of the site 120 (in radians). Other manners for determining the distance d are within the scopes of various embodiments.

The mobile terminal 140 is configured to compare the distance d with the radius R. When d>R, the mobile terminal 140 is determined as not being within the radius R from the site 120. When d≤R, the mobile terminal 140 is determined as being within the radius R from the site 120.

In response to determining that the mobile terminal 140 is not within the radius R from the site 120, the mobile terminal 140 is configured to disable the task from being performed using the mobile terminal 140, as schematically indicated at 142. For example, a processor of the mobile terminal 140 stops or prevents a module corresponding to the task from being executed by the mobile terminal 140, and/or hides a GUI to be used by the user 150 to enter data as required by the task, and/or disables a camera of the mobile terminal 140 to prevent the user 150 from taking a picture or image with the mobile terminal 140. In some embodiments, the user 150 is not able to use the mobile terminal 140 to perform at least a portion of the required task. In some embodiments, the user 150 is not able to use the mobile terminal 140 to perform any portion of the required task.

When the user 150 carrying the mobile terminal 140 approaches the site 120, as schematically indicated at 144, the mobile terminal 140 determines that it is now within the circle 122. In response to determining that the mobile terminal 140 is within the radius R from the site 120, the mobile terminal 140 is configured to enable the task to be performed using the mobile terminal 140, as schematically indicated at 146. For example, the processor of the mobile terminal 140 enables all functionality of the mobile terminal 140 required for performing the task, e.g., by executing a module corresponding to the task, and/or visually presenting the GUI to be used by the user 150 to enter data as required by the task, and/or enabling a camera of the mobile terminal 140 to permit the user 150 to capture a picture or image with the mobile terminal 140.

In some embodiments, by disabling the task from being performed using the mobile terminal 140 when the mobile terminal 140 is outside the circle 122, it is possible to prevent incorrect and/or fraudulent activities from being performed at an incorrect location.

The circle 122 in FIG. 1B is an example of a predetermined area containing the site 120 for geofencing, i.e., a task is disabled from being performed using the mobile terminal 140 when the mobile terminal 140 is outside the predetermined area, and the task is enabled to be performed using the mobile terminal 140 when the mobile terminal 140 is within the predetermined area. However, other configurations of a predetermined area for geofencing are within the scopes of various embodiments. For example, a predetermined area for geofencing may have a shape other than a circle, and/or may be presented/defined by more than one parameters including one or more dimensions, angles, ratios, or the like.

Figure 2:
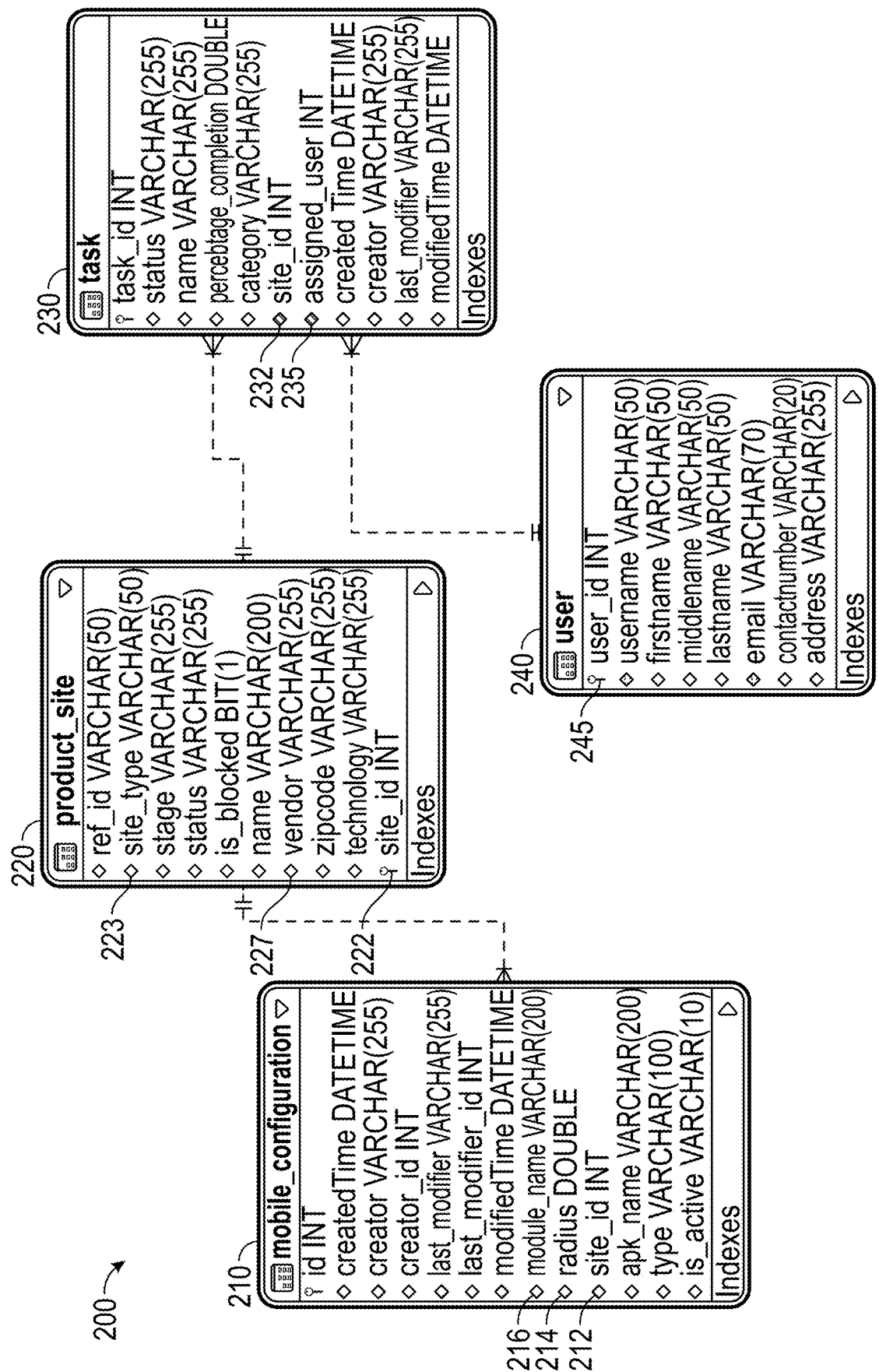
FIG. 2 is a schematic diagram of a database maintained by a task management system, in accordance with some embodiments.

FIG. 2 is a schematic diagram of a database 200 maintained by a task management system, in accordance with some embodiments. In some embodiments, the database 200 is maintained at the server 130.

The database 200 is configured for task management, and comprises a plurality of tables 210, 220, 230, 240. Each of the tables 210, 220, 230, 240 comprises a plurality of fields. The numbers of fields and the particular lists of fields in the tables 210, 220, 230, 240 in FIG. 2 are examples. Other table configurations and/or database configurations are within the scopes of various embodiments.

The table 210 is a mobile configuration table which comprises a plurality of mobile configurations to be provided to one or more mobile terminals, such as the mobile terminal 140, for assigning tasks to be performed by corresponding users, such as the user 150, of the mobile terminals. The mobile configuration table 210 comprises at least a side_id field 212, a radius field 214, and a module_name field 216. For each mobile configuration, the side_id field 212 includes a side_id, or an identification, of a site where the task corresponding to the mobile configuration is to be performed, the radius field 214 includes an enterable and/or editable radius associated with the site, and the module_name field 216 includes a name of a module corresponding to the task. In some embodiments, the module is executed by a mobile terminal for performing the task.

The table 220 is a product site table which comprises information about a plurality of sites where various tasks are to be performed. The product site table 220 comprises at least a side_id field 222, a site_type field 223 indicating a type of each site, a vendor field 227 indicating a vendor of each site, and one or more fields (not shown) for storing information on the physical location of each site. In at least one embodiment, the information on the physical location of each site comprises the longitude and latitude of the site. In some embodiments, at least one of the site_type field 223 or the vendor field 227 is omitted. The side_id field 222 of the product site table 220 corresponds to the side_id field 212 of the mobile configuration table 210, and therefore, the side_id, or site identification, serves as a key that links the mobile configuration table 210 and the product site table 220.

The table 230 is a task table which comprises information about a plurality of tasks to be performed at the plurality of sites, and the table 240 is a user table which comprises information about a plurality of users, such as the user 150, assigned to perform the tasks. The task table 230 comprises at least a side_id field 232 corresponding to the side_id field 222 in the product site table 220. The side_id, or site identification, serves as a key that links the product site table 220 and the task table 230. The task table 230 further comprises an assigned_user field 235 which includes a user_id, or user identification, of a user (e.g., a field engineer or technician) assigned to perform a task. The assigned_user field 235 corresponds to a user_id field 245 in the user table 240. The user_id serves as a key that links the task table 230 and user table 240. Although not shown in FIG. 2, in at least one embodiment, the user table 240 further comprises one or more fields indicating qualifications, technical levels, and/or privileges of the users.

In the example configuration of the database 200 in FIG. 2, each site in the product site table 220 is mapped to a corresponding mobile configuration in the mobile configuration table 210 by a key, i.e., the site_id. One or more tasks are initiated on a particular site. The task table 230 has the site_id as the key which maps tasks in the task table 230 to sites in the product site table 220. Each task is assigned to a user. The task table 230 has the assigned_user field 235 which stores user_id of users in the user table 240. The user table 240 includes information of the users, (e.g., field engineers or technicians).

When a task is assigned to a user 150 (e.g., a field engineer or technician), a corresponding mobile configuration defined in the mobile configuration table 210 is sent to the mobile terminal 140 of the user 150 whose user_id is indicated in the assigned_user field 235 of the task table 230 and the user_id field 245 of the user table 240. The mobile configuration sent to the mobile terminal 140 comprises at least a site_id of the site where the task is to be performed, as indicated by the side_id field 232 of the task table 230, the side_id field 222 of the product site table 220, and the side_id field 212 of the mobile configuration table 210. The mobile configuration sent to the mobile terminal 140 further comprises a radius associated with the site, as indicated in the radius field 214 of the mobile configuration table 210. In some embodiments, the mobile configuration sent to the mobile terminal 140 further comprises the name of the module corresponding to the task to be performed, as indicated in the module_name field 216 of the mobile configuration table 210. In some embodiments, the physical location of the site where the task is to be performed is read out from the product site table 220 and sent to the mobile terminal 140 of the user 150 assigned to perform the task.

FIGS. 3A-3C are schematic diagrams of various screens 300A-300C of a graphical user interface (GUI) 300 at a task management system, in accordance with some embodiments.

In some embodiments, the GUI 300 is at the server 130 and is configured to enable a user to interact with, manage, or modify data in the database 200 for task management. Herein, a user at the server 130 and/or using the GUI 300 is a person, or a group of persons, who create(s) or modifies tasks to be performed at various sites by other users, who are field engineers or technicians, using mobile terminals. In an example, a user at the server 130 and/or using the GUI 300 is an administrator (admin), or a person with sufficient privileges. For simplicity, a user at the server 130 and/or using the GUI 300 is hereinafter referred to as an admin.

In some embodiments, a GUI is executed by a processor and caused to be visually presented to a user, e.g., an admin, a field engineer or a technician. An example of visual presentation of a GUI includes displaying the GUI with one or more editable fields, parameters, values, menu items, or the like, on a display, such as a monitor or a touch screen. Other ways for visually presenting information, such as projection on a screen, three-dimensional (3D) projection, using glasses and/or other head-mounted devices, or any other manners for presenting information to be visually perceptible by a user, are within the scopes of various embodiments. For simplicity, "displaying" or "displayed" may be used in the following description as an example manner for visual presentation of information. Other manners for visual presentation, as discussed herein, are not excluded. A user may interact with displayed, or otherwise visually presented, information by a pointing device (e.g., a mouse), a touch screen, contact-less gestures, or the like.

In FIG. 3A, the screen 300A of the GUI 300 includes a list of mobile configurations 301-307. The number and details of mobile configurations in the screen 300A are examples. In some embodiments, the mobile configurations 301-307 are defined in the mobile configuration table 210 and product site table 220 of the database 200. Each of the mobile configurations 301-307, when assigned to a user 150 and transmitted to the corresponding mobile terminal 140, corresponds to a task to be performed by the assigned user 150 using the corresponding mobile terminal 140. In the screen 300A, each of the mobile configurations 301-307 is presented by corresponding data under a Module Name column 316, a Site column 312, a Radius column 314, a Type column 323. The screen 300A further includes, for each of the mobile configurations 301-307, a menu item under an Action column 328.

For example, the mobile configuration 302 includes a module name TSSR (site survey), a site identification ZSMG2_0198, a radius 130 (m), a type Site, and a menu item 351 correspondingly under the columns 316, 312, 314, 323, 328. The module name TSSR is retrieved from the module_name field 216 in the mobile configuration table 210, and indicates a name (TSSR) of a module to be executed when the corresponding task (site survey) is performed. The site identification ZSMG2_0198 and radius 130 (m) are retrieved from the side_id field 212 and radius field 214 in the mobile configuration table 210, and indicate the site (i.e., ZSMG2_0198) where the task is to be performed, and the specified radius (i.e., 130 m) within which the task is enabled to be performed. The type Site is retrieved from the site_type field 223 of the product site table 220. The menu item 351, upon user selection, causes a screen similar to the screen 300B described herein to be displayed to permit an admin to edit or modify the corresponding mobile configuration 302. The text JTE_M_02985 under the Site column 312 for the mobile configuration 302 indicates a vendor of the site ZSMG2_0198. In some embodiments, vendor and/or site type information is omitted.

The screen 300A shows that it is possible to have several tasks at the same site. For example, the mobile configurations 304, 305 corresponding to different tasks (i.e., different module names LOS Microwave and RFI-B at the same site ZBDG_6336. In FIG. 3A, both mobile configurations 304, 305 are set with the same radius, e.g., 700 m, from the site ZBDG_6336. This is an example. In at least one embodiment, it is possible that different tasks (or modules) at the same site are set with different radiuses, so that a task with a larger radius is enabled to be performed when the user is far from the site, but another task with a smaller radius is not enabled to be performed until the user gets closer to the site. A possible reason for this setup is due to the natures of the tasks to be performed. The screen 300A further shows that the radiuses may be specified so that each site is associated with a unique radius different the other sites. A possible reason is that each site is unique in one or more aspects, such as the site's physical location and/or surrounding, equipment at the site, or the like. Various radiuses are set anew or modified by an admin as described herein. For example, the screen 300A further comprises a menu item 350 which, upon user selection, causes the screen 300B described with respect to FIG. 3B to be displayed, to permit an admin to add a new mobile configuration.

In FIG. 3B, the screen 300B is displayed in response to user selection of the menu item 350 on the screen 300A. The screen 300B permits an admin to add a new mobile configuration or task to the database 200. The screen 300B includes a Side Id input area 352, a Type input area 353, a Radius input area 354, a Module Name input area 356, a Cancel button 357, and an Add button 358. In some embodiments, all input areas 352, 353, 354, 356 are blanked when the screen 300B is first displayed. The input areas 352, 353, 354, 356 permit the admin to input corresponding data for a new mobile configuration into the corresponding side_id field 212, site_type field 223, radius field 214, module_name field 216 in the corresponding tables in the database 200. The admin inputs data by selecting an appropriate option from a drop-down menu, e.g., as schematically shown for the Type input area 353 and Module Name input area 356, and/or by manually entering the data, e.g., as in the Radius input area 354 and Side Id input area 352. In some embodiments, the Side Id input area 352 includes a drop-down menu.

A radius is enterable by the admin in the Radius input area 354. In some embodiments, the value (or magnitude) of the radius is determined by the admin, based on one or more factors including, but not limited to, the admin's expertise, the nature of the task to be performed, technical properties of equipment at the site, the actual landscape at or in vicinity of the site, or the like. For example, for site survey and/or equipment installation tasks, it is necessary that a field engineer or technician be physically at, or in near vicinity, of the site, and therefore, the radius is set to be small, e.g., 10-20 m. For another example, for a site that is located in a crowded area such as a shopping mall, it is possible that the radius is set to be larger, e.g., at a few hundred meters. In some embodiments, a default radius is automatically determined, e.g., based on one or more of the above factors, and is included by the server 130 in the Radius input area 354. The admin may simply accept the automatically generated, system-proposed default radius, or modify the default radius.

When the admin wants to abort the process of adding a new mobile configuration, the Cancel button 357 is selected and the GUI 300 returns to the screen 300A. When the admin wants to accept the new mobile configuration input through the screen 300B, the Add button 358 is selected. As a result, the input data of the new mobile configuration is recorded in the corresponding fields and tables of the database 200, and the GUI 300 shows the new mobile configuration in a screen 300C as described with respect to FIG. 3C.

In FIG. 3C, the screen 300C is similar to the screen 300A, but includes a new mobile configuration 308 with a site ZIBDG_5031, a radius of 10000000000 m, a module Installation, and a type Site correspondingly entered through the Side Id input area 352, Radius input area 354, Module Name input area 356, Type input area 353 of the screen 300B.

In some embodiments, when a user, e.g., a field engineer or technician, provides feedback that the current radius set for a site is too large or too small for a task, an admin may make an adjustment by selecting, on the screen 300A or 300C, the menu item under the Action column 328 and corresponding to the task to be modified, e.g., the menu item 351 on the screen 300A. The screen 300B will then be displayed in response, with the current data of the task. The admin may then modify the displayed data, including, but not limited to, the value of the radius R in the Radius input area 354. The ability of admins to input or modify a radius for enabling a task to be performed at a site provides customizability and/or flexibility to the task management system.

Figure 4A:
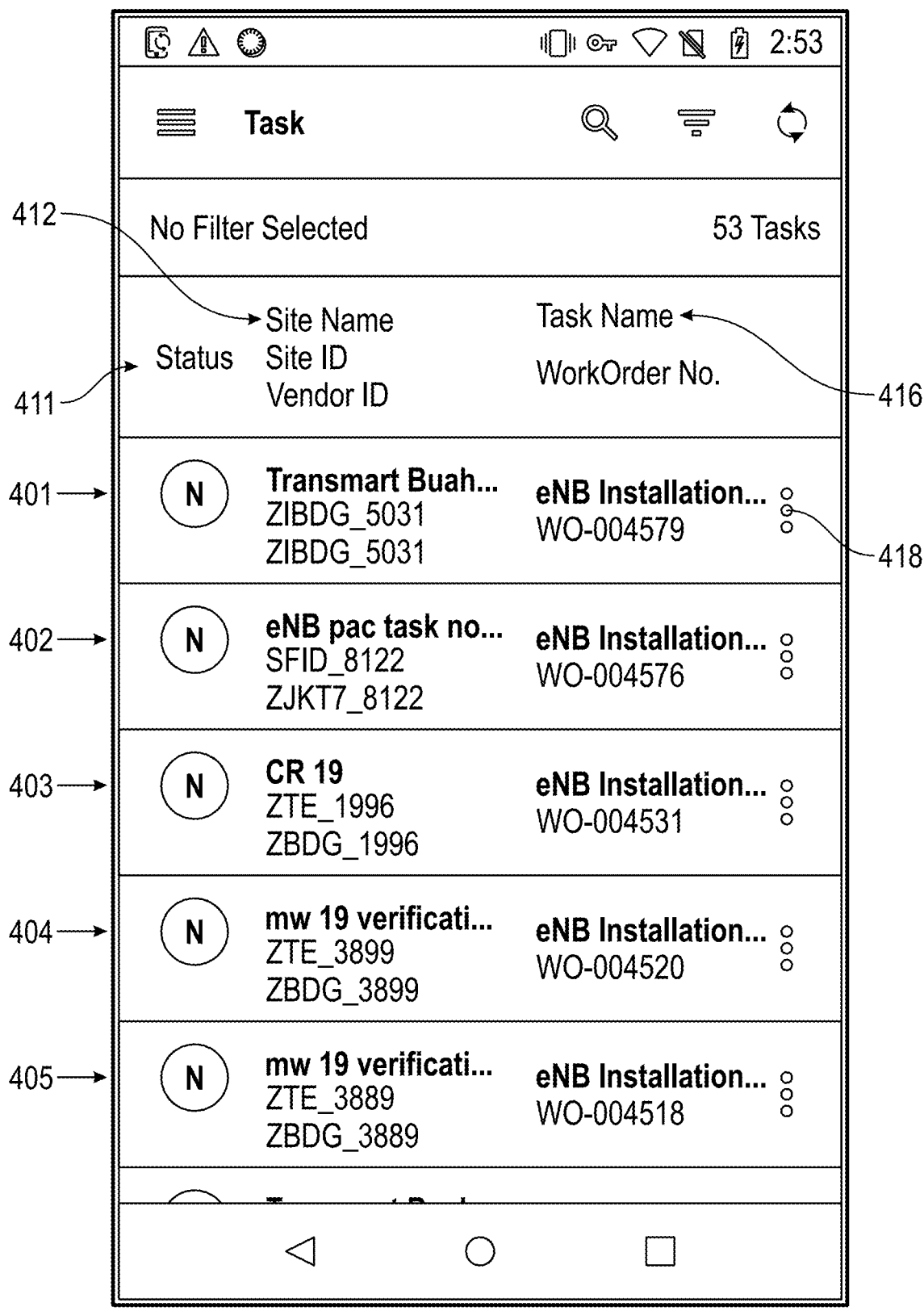
FIGS. 4A-4C are various schematic diagrams of a graphical user interface (GUI) at a mobile terminal, in accordance with some embodiments.
Figure 4B:
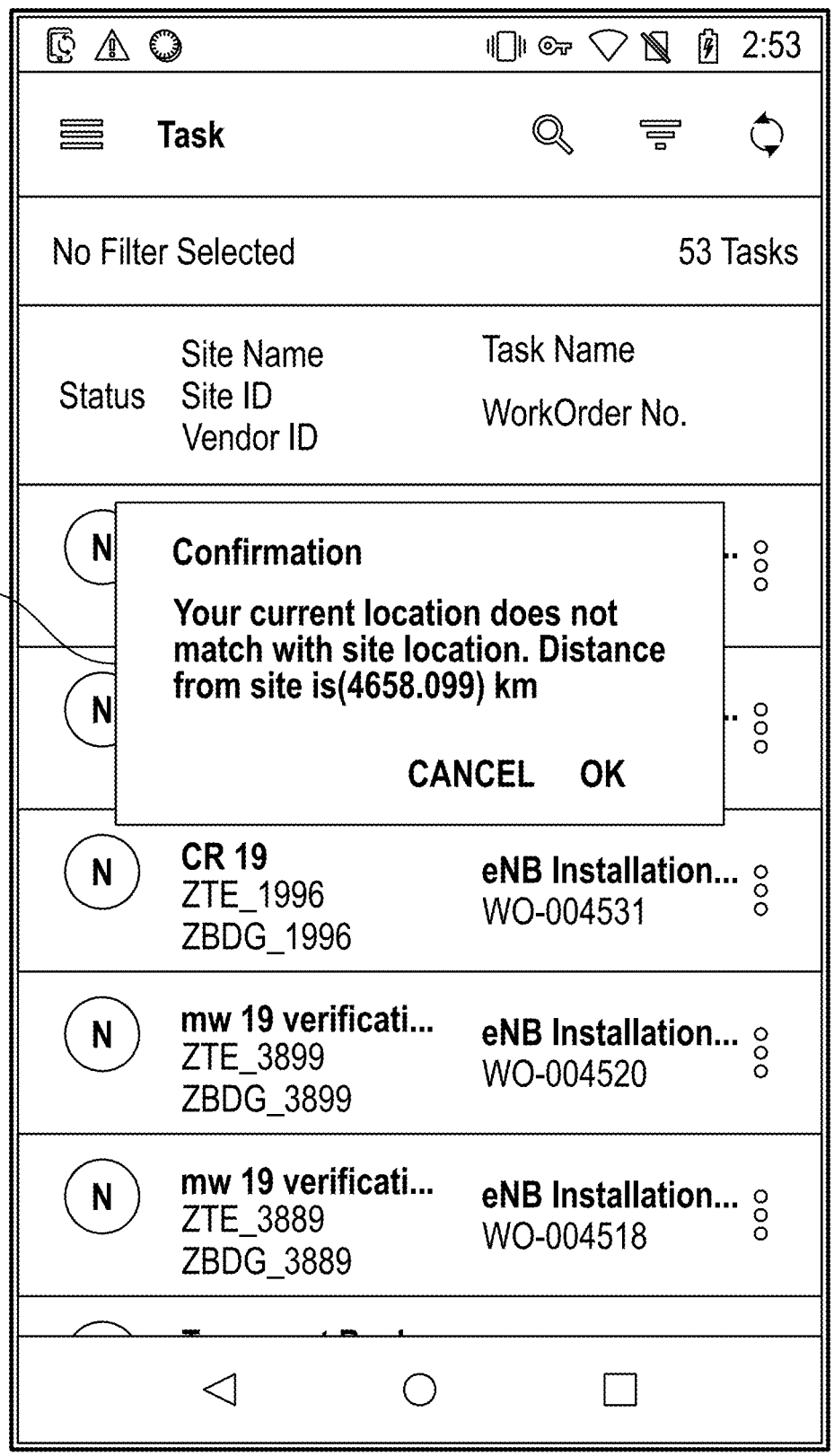
Figure 4C:
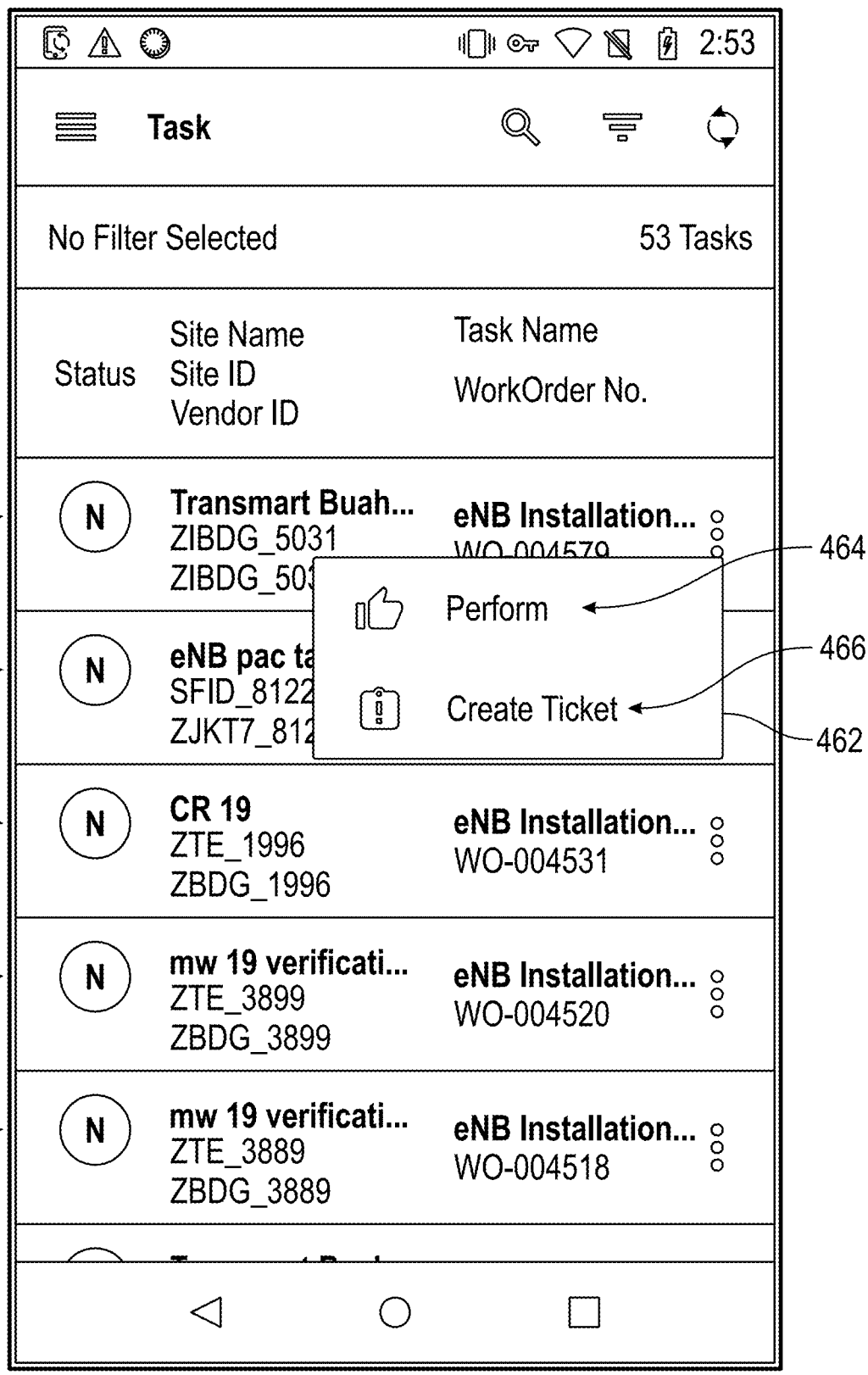

FIGS. 4A-4C are schematic diagrams of various screens 400A-400C of a graphical user interface (GUI) 400 at a mobile terminal, in accordance with some embodiments. In some embodiments, the GUI 400 is executed and displayed at a mobile terminal of a user (e.g., a field engineer or technician) assigned to perform a task with the mobile terminal at a site associated with the task. For example, the GUI 400 is executed and displayed at the mobile terminal 140 of the user 150.

In FIG. 4A, the screen 400A of the GUI 400 includes a list of tasks 401-405 assigned to the user 150 of the mobile terminal 140 on which the GUI 400 is executed and displayed. The number and details of the tasks in the screen 400A are examples. Each of the tasks 401-405 corresponds to a mobile configuration sent, e.g., from the server 130, to the mobile terminal 140. In the screen 400A, each of the tasks 401-405 is presented by corresponding data under columns 411, 412, 416. The screen 400A further includes, for each of the tasks 401-405, a menu item 418 for initiating the corresponding task on the mobile terminal 140. For example, the task 401 includes a status N (e.g., not completed) under the column 411, a site identification ZIBDG_5031 under column 412, and a task name eNB Installation under the column 416. The site identification ZIBDG_5031 corresponds to a site identification included in a corresponding mobile configuration sent of the mobile terminal 140. The task name eNB Installation corresponds to a module name (e.g., Installation) also included in the corresponding mobile configuration sent of the mobile terminal 140. The status N indicates that the task 401 has not been completed. In some embodiments, the status is changed once the task 401 has been completed. In the example configuration in FIG. 4A, the task 401 further includes a site name Transmart Buah and a vendor ID (identification) under the column 412, and a work order No. WO-004579 under the column 416. In some embodiments, one or more of the information on the site name, vendor ID, work order is/are omitted.

A radius associated with the site ZIBDG_5031 is also sent, as part of the corresponding mobile configuration, from the server 130 to the mobile terminal 140, but is not displayed in the screen 400A. The radius, however, is used by the mobile terminal 140 to determine how the GUI 400 behaves when the user attempts to initiate the task 401, e.g., by selecting the menu item 418.

Upon user selection of the menu item 418, the mobile terminal 140 determines whether it is within the specified radius associated with the site ZIBDG_5031 at which the task 401 is to be performed. The mobile terminal 140 is configured to determine the distance between itself and the site ZIBDG_5031, by using its own physical location and a physical location of the site ZIBDG_5031. In at least one embodiment, the mobile terminal 140 determines its own physical location, e.g., by using a GPS receiver included in the mobile terminal 140. In some embodiments, the physical location of the mobile terminal 140 is presented by the longitude and latitude of the mobile terminal 140. In some embodiments, the physical location of the site ZIBDG_5031, e.g., its longitude and latitude, is transmitted from the server 130 to the mobile terminal 140 together with the site identification, i.e., in the mobile configuration corresponding to the task 401. In at least one embodiment, the physical location of the site ZIBDG_5031 is pre-loaded in the mobile terminal 140. Based on the known longitudes and latitudes of the mobile terminal 140 and the site ZIBDG_5031, the distance between the mobile terminal 140 and the site ZIBDG_5031 by using the Equation (1) described herein. The determined distance is then compared to the specified radius associated with the site ZIBDG_5031. If the distance is greater than the specified radius, i.e., the mobile terminal 140 is outside the specified radius from the site ZIBDG_5031, the screen 400B in FIG. 4B is displayed. If the distance is not greater than the specified radius, i.e., the mobile terminal 140 is within the specified radius from the site ZIBDG_5031, the screen 400C in FIG. 4C is displayed.

In FIG. 4B, i.e., when the mobile terminal 140 is outside the specified radius from the site ZIBDG_5031, the screen 400B is displayed and includes a pop-up notice 460 overlying the screen 400A which is greyed out. Other manners for visually presenting the notice 460 are within the scopes of various embodiments. The notice 460 indicates that the current physical location of the mobile terminal 140 does not match with the physical location of the site ZIBDG_5031. The notice 460 further includes the calculated distance (e.g., 4658.099 km) between the current location of the mobile terminal 140 and the site ZIBDG_5031 where the task 401 the user 150 attempted to initiate is to be performed. The notice 460 further includes Cancel and OK buttons, the selection of either of which will remove the notice 460 from being displayed, but will not permit the user 150 to use the mobile terminal 140 to perform the task 401.

The visual presentation of the notice 460 is an example of how the mobile terminal 140 indicates that the task 401 is disabled from being performed. In some embodiments, the notice 460 is omitted and/or another type of notice is generated by the mobile terminal 140 to inform the user 150 that the task 401 is disabled from being performed. In some embodiments, no indication is given at all by the mobile terminal 140 which simply disables the task 401 from being performed. The mobile terminal 140 disables the task 401 in one or more manners described herein. In an example, e.g., the mobile terminal 140 stops initializing or executing a module associated with the task 401 (e.g., a module Installation corresponding to the module name in the mobile configuration received from the server 130). Alternatively or additionally, the mobile terminal 140 hides or does not display a GUI or form to be used by the user 150 to enter and/or capture data as required by the task 401. In some embodiments, the user 150 is not able to use the mobile terminal 140 to perform at least one portion, or any portion, of the task 401.

In FIG. 4C, i.e., when the mobile terminal 140 is within the specified radius from the site ZIBDG_5031, the screen 400C is displayed and includes a pop-up menu 462 overlying the screen 400A. Other manners for visually presenting the menu 462 are within the scopes of various embodiments. The menu 462 includes a menu item 464 (i.e., Perform) and a menu item 466 (i.e., Create Ticket). Upon user selection of the menu item 464, the task 401 is initiated, e.g., by the mobile terminal 140 executing the module Installation corresponding to the task 401 and/or by the mobile terminal 140 displaying a form to be filled in by the user 150 with data captured by the mobile terminal 140, or by other equipment. Upon user selection of the menu item 466, the mobile terminal 140 permits the user 150 to creates a ticket corresponding to services to be performed by the user 150. In some embodiments, the menu item 466 is omitted.

The visual presentation of the menu 462 is an example of how the mobile terminal 140 indicates that the task 401 is enabled to be performed. In some embodiments, the menu 462 is omitted and/or another type of notice or menu is generated by the mobile terminal 140 to inform the user 150 that the task 401 is enabled to be performed with the mobile terminal 140. In some embodiments, no indication is given at all by the mobile terminal 140 which simply initiates the task 401 in one or more manners as described herein. For example, in response to user selection of the menu item 418 and determination that the mobile terminal 140 is within the specified radius R from the site ZIBDG_5031, the mobile terminal 140 simply initiates the task 401, e.g., by showing the form required to be filled in by the user 150 with data captured at the site ZIBDG_5031.

Figure 5A:
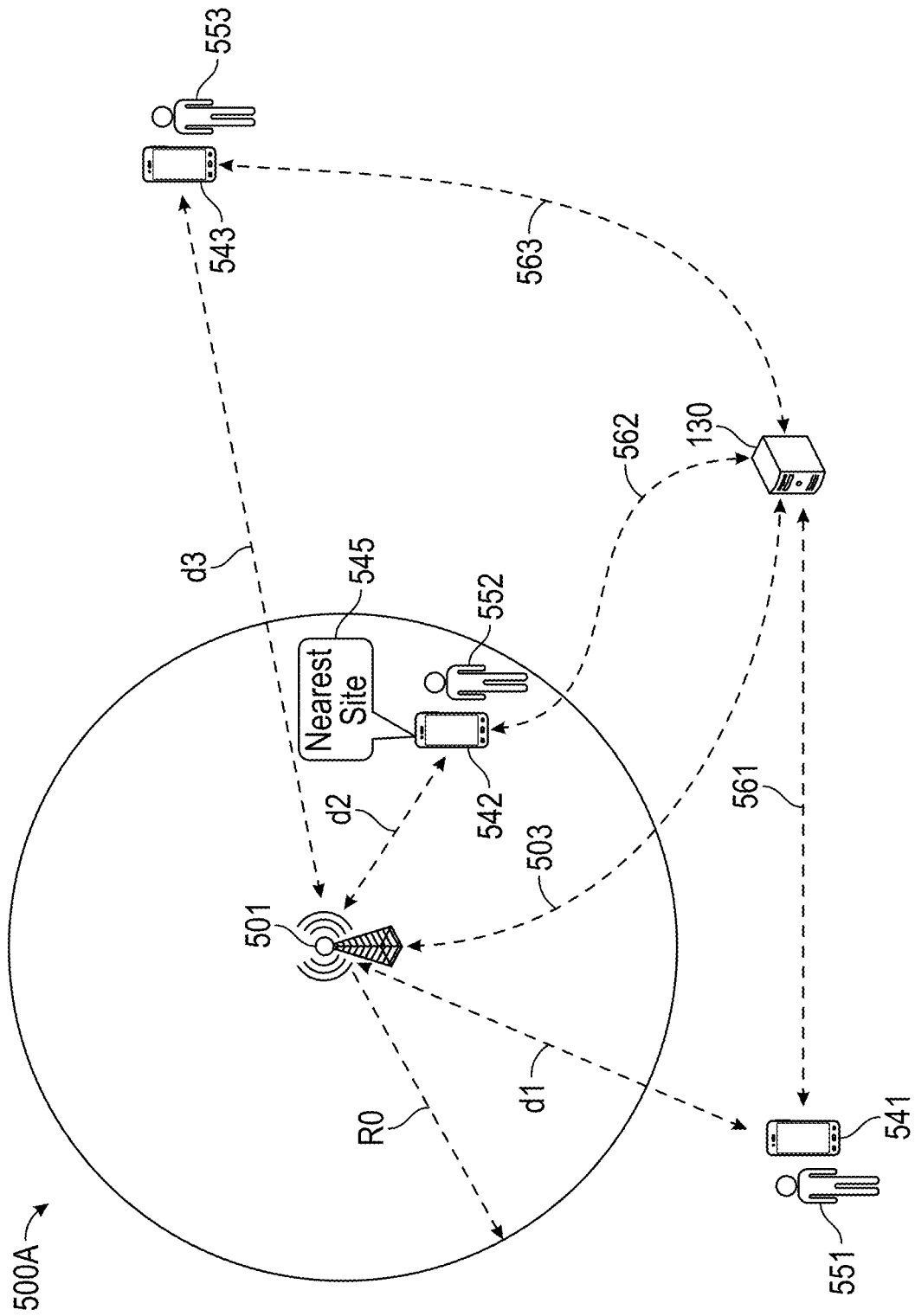
FIG. 5A is a schematic diagram of a section of a communications network, in accordance with some embodiments.

FIG. 5A is a schematic diagram of a section 500A of a communications network, in accordance with some embodiments. For example, the section 500A is part of the communications network 100.

In FIG. 5A, a situation is schematically illustrated in which the user of a mobile terminal is notified of a nearby site available for, or requiring, a service visit. Such a situation is often met in practice where multiple technicians are continuously travelling among a plurality of sites to perform site/service visits. For example, when a critical alarm/activity needs to be completed at a site, a task management system will continuously check the nearby technicians or field engineers, locate a technician or field engineer within the specified radius associated with the site, and provide the located technician or field engineer with an alert or notice about the work needs to be done at the site. In some embodiments, a guided path to the site is also provided to the located technician or field engineer.

For example, in FIG. 5A, an alarm occurs at a site 501 and is notified, as schematically indicated at 503, to the server 130 of a task management system. The site 501 has an associated radius RO specified in the database 200 at the server 130. In response to the notification of an alarm from the site 501, the server 130 determines that a service visit by a technician to the site 501 is required. Alternatively, the site 501 itself notifies the server 130 that a service visit is requested. The server 130 periodically receives physical locations of a plurality of mobile terminals 541, 542, 543 carried by corresponding users 551, 552, 553 (e.g., field engineers or technicians) as schematically indicated at 561, 562, 563. For example, the mobile terminals 541, 542, 543 are configured to report their physical locations to the server 130 every few minutes. Based on the physical location of the site 501 stored in the database 200 and the periodically updated physical locations of the mobile terminals 541, 542, 543, the server 130 is configured to determine corresponding distances d1, d2, d3 between the site 501 and the mobile terminals 541, 542, 543 carried by the travelling users 551, 552, 553, for example, by using the Equation (1) described herein. When a determined distance, e.g., d2, becomes equal to or smaller than the radius RO associated with the site 501, the server 130 determines that the user 552 carrying the corresponding mobile terminal 542 is within the radius RO and may perform a service visit to the site 501. The server 130 transmits a notice to the mobile terminal 542 instructing the user 552 to visit the site 501. An example of such a notice is described with respect to FIG. 5B.

Figure 5B:
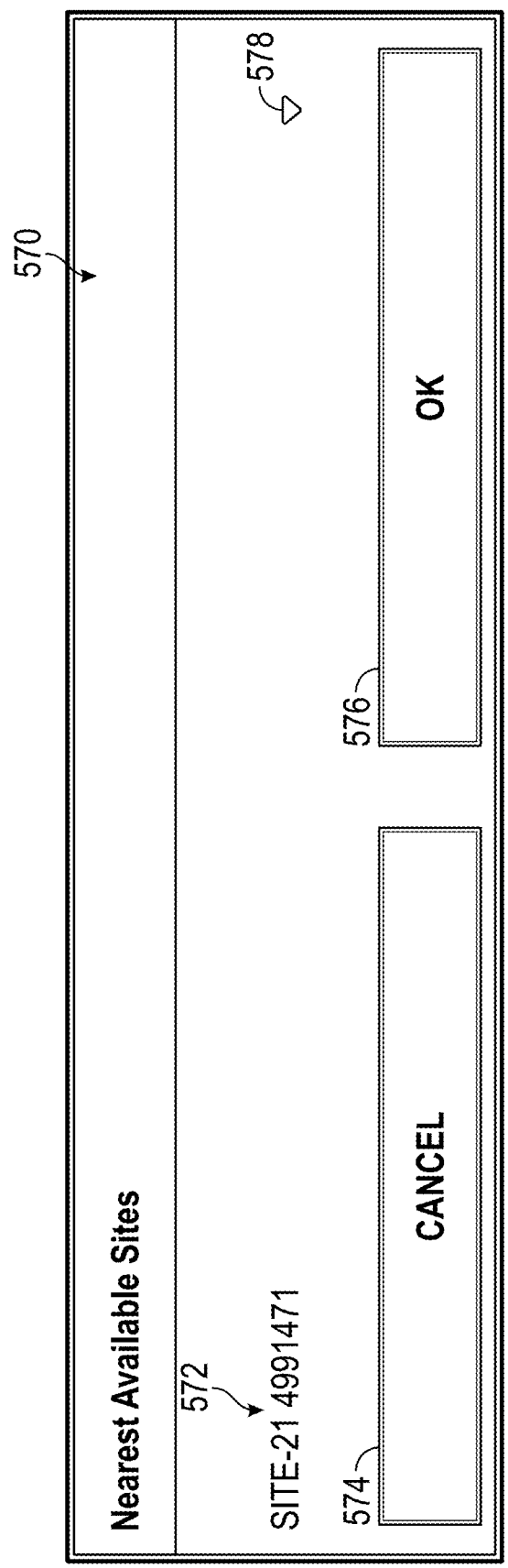
FIG. 5B is a schematic diagram of a notice at a mobile terminal, in accordance with some embodiments.

FIG. 5B is a schematic diagram of a notice 570 at a mobile terminal, in accordance with some embodiments.

The notice 570 is an example of a notice sent by the server 130 to a mobile terminal, e.g., 542, instructing the corresponding user 552 of the mobile terminal 542 to visit the site 501, e.g., indicated by a site_id 572 in the notice 570. In some embodiments, the notice 570 is a pop-up notice shown by the mobile terminal 542 upon receipt from the server 130. The notice 570 further includes a Cancel button 574 and an OK button 576. The user 552 selects the Cancel button 574 to deny the task requesting him or her to visit the site 501, or selects the OK button 576 to accept the task. In some embodiments, several sites are available for, or requesting, service visits. Such sites are included in a drop-down menu as schematically indicated at 578. The user 552 may select one of the sites for his or her next visit from the drop-down menu. Other formats and/or configurations for the notice 570 are within the scopes of various embodiments.

Figure 5C:
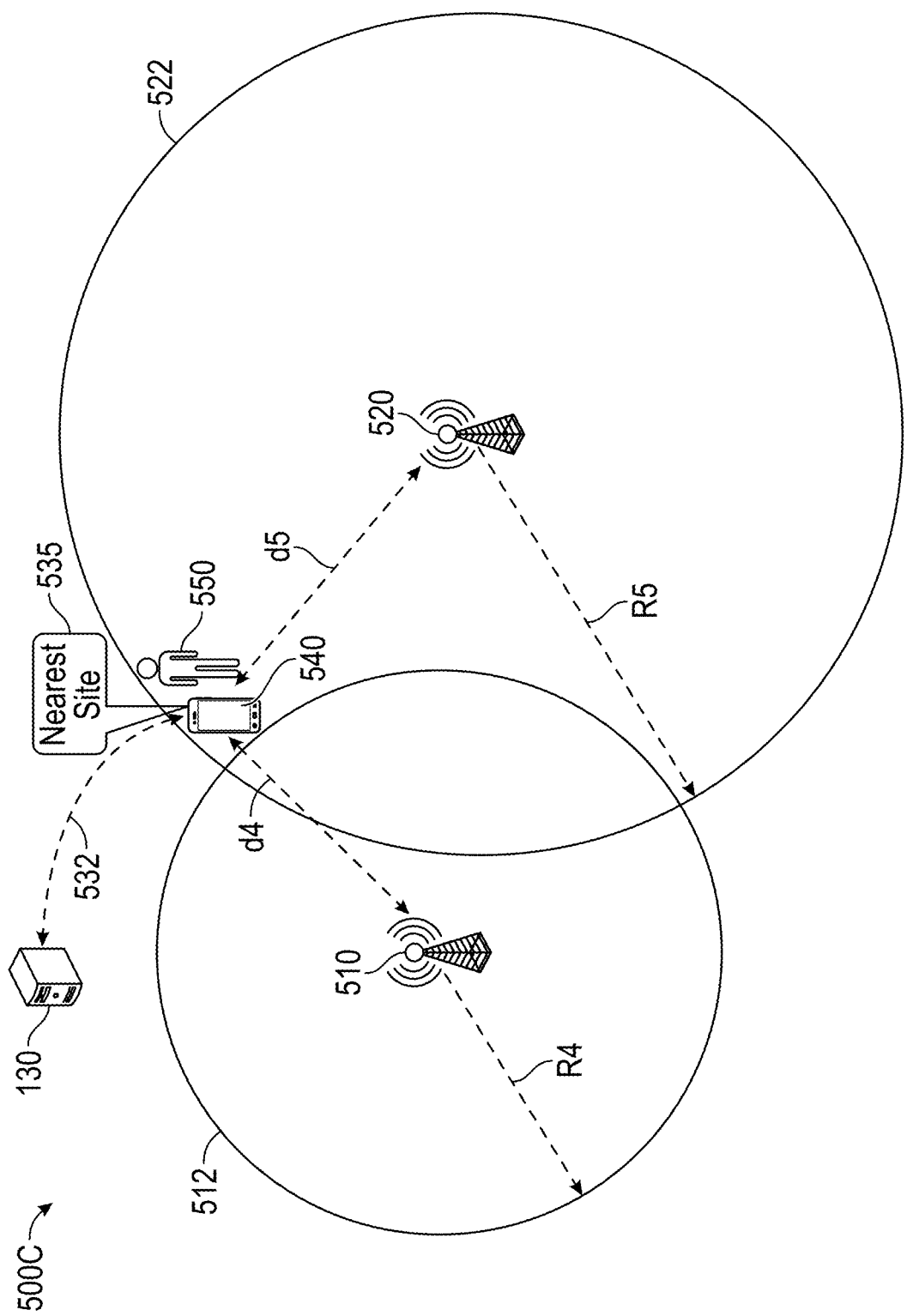
FIG. 5C is a schematic diagram of a section of a communications network, in accordance with some embodiments.

FIG. 5C is a schematic diagram of a section 500C of a communications network, in accordance with some embodiments. For example, the section 500C is part of the communications network 100.

In FIG. 5A, the server 130 monitors distances from multiple mobile terminals and the corresponding users to a site, to determine an appropriate user to visit the site. FIG. 5C describes a reversed situation where the server 130 monitors distances from a mobile terminal 540 and the corresponding user 550 to multiple sites 510, 520, to determine an appropriate site for the user 550 to visit. Some embodiments encompass a combined arrangement in which the server 130 monitors distances among multiple mobile terminals and multiple sites, to determine which site is to be visited by which user.

In the example configuration in FIG. 5C, the server 130 periodically receives, e.g., every few minutes, a physical location of the mobile terminal 540 carried by the corresponding users 550 (e.g., a field engineer or technician) as schematically indicated at 532. Based on the physical locations of the sites 510, 520 stored in the database 200 and the periodically updated physical location of the mobile terminal 540, the server 130 is configured to determine corresponding distances d4, d5 between the sites 510, 520 and the mobile terminal 540, e.g., by using the Equation (1) described herein. The server 130 compares the determined distances d4, d5 correspondingly with radiuses R4, R5 associated with the sites 510, 520. When a determined distance becomes equal to or smaller than the corresponding radius, e.g., d5≤R5, the server 130 determines that the user 550 carrying the mobile terminal 540 is within the radius R5 associated with the site 520, and may perform a service visit to the site 520. The server 130 transmits a notice to the mobile terminal 540 instructing the user 550 to visit the site 520. An example of such a notice is described with respect to FIG. 5B. It should be noted that the user 550 is not necessarily asked to visit the physically closest site. For example, in FIG. 5C, d4<d5, meaning that the user 550 is closer to site 510 than to site 520. However, because d4>R4 whereas d5≤R5, the server 130 instructs the user 550 to visit the farther site 520 instead of the closest site 510.

As described herein, during the rollout of a network or facilities, some of the activities or tasks need to be performed in the field at the site locations. There is, however, no restriction on users, e.g., field engineers or technicians, to capture the data required for a task on the actual location. There might be chances that the field engineer or technician, to whom a task to be performed at a site is assigned, does not perform the required task on the actual site. Instead, the field engineer or technician may capture data from an incorrect location, or may upload the data of another site, which causes incorrect site data to be recorded in the system and/or potentially leads to fraudulent activities from a vendor/partner. Further, if any emergency work is needed and/or a critical alarm occurs on any of the sites, it is difficult to find the appropriate engineer/technician who is nearby. A reason is that, in accordance with the other approaches, activities such as site visits are managed offline, e.g., by using a spreadsheet. Manual efforts for task management and/or for identifying the appropriate engineer/technician in the field result in incorrect information and/or negatively impact the operation cost, e.g., where the operator has to pay the vendor/field engineer for site visits. Besides increased cost, inefficient task management may lead to delays in system/service rollout. The described issues in the other approaches are advantageously overcome in accordance with one or more embodiments.

In at least one embodiment, incorrect or fraudulent data entries are preventable by incorporating geofencing features in a task management system. With geofencing features, an admin module, e.g., on the server side, allows admins to configure/specify a unique radius for each site. On the user side, a user (e.g., a field engineer or technician) will not be able to perform any activity required by the task if he/she is outside a range around the site as defined by the specified radius.

In at least one embodiment, the problem of identifying an appropriate engineer or technician in the field to service a site is solved by an automated process, instead of manual efforts as in the other approaches. For example, the task management system, e.g., a server, continuously or periodically checks physical locations of a plurality of nearby technicians/field engineers. When a technicians/field engineer is within the range defined by a specified radius associated with the site, the system or server provides him/her with an alert/notice about the required site visit and, in some embodiments, a guided path to the site. In other words, the system automatically assigns a task to a particular engineer/technician who is nearby to the site associated with the task. Such automatic task management reduces the revisit cost for the vendor, in at least one embodiment.

In some embodiments, the selection process using geofencing features is based on longitudes and latitudes of at least one site and at least one user (e.g., field engineers or technicians), and a radius specified for the site. As a result, it is possible in one or more embodiments, to achieve an easy way to create an admin configuration/module, and/or flexibility to calculate a range from the site location based on the latitude/longitude and the specified radius. The described geofencing features provide the radius configuration at the site and task level, which is applicable on mobile applications at mobile terminals while performing tasks and/or activities. In at least one embodiment, an error pop-up message will be shown on the mobile application at a mobile terminal if the user is trying to use the mobile terminal to perform the required task/activity at a location outside the range defined by the specified radius associated with the site. The provided geofencing features ensure that all activities required by a task are performed on the actual site associated with the task, and not on any other location.

In some embodiments, a mobile application with geofencing features and for execution on a mobile terminal, e.g., as described with respect to one or more of FIGS. 4A-4C, is developed in Android. In some embodiments, an admin module with geofencing features and for execution on a server, e.g., as described with respect to one or more of FIGS. 2, 3A-3C, 5A-5C, is developed using Angular json (JS) and Angular material UI library. The admin module provides a radius configuration screen, e.g., as described with respect to FIG. 3B. In some embodiments, a radius configuration import feature is developed using Apache POI tool. In an example of the radius configuration import feature, an admin has the privilege to upload, e.g., to the database 200, sites along with their radius configuration in bulk, e.g., in a spreadsheet. In the spreadsheet, the admin provides, for each site among a plurality of sites, site_id, radius and site_type. The site_id, radius and site_type in the uploaded spreadsheet are incorporated in the corresponding fields in the database 200. Using this feature, every site can have a different, or independently designated, radius depending on the surrounding area and/or the location where the site is located. An example spreadsheet format is Microsoft Excel. Other spreadsheet formats and/or manners for bulk uploading of multiple sites and their radius configurations to a database are within the scopes of various embodiments. In some embodiments, the execution of geofencing features is at the site and task level. The described platforms and/or software such as Android, Angular, json, Apache, or the like, are examples. Other platforms and/or software configurations are within the scopes of various embodiments.

Figure 6A:
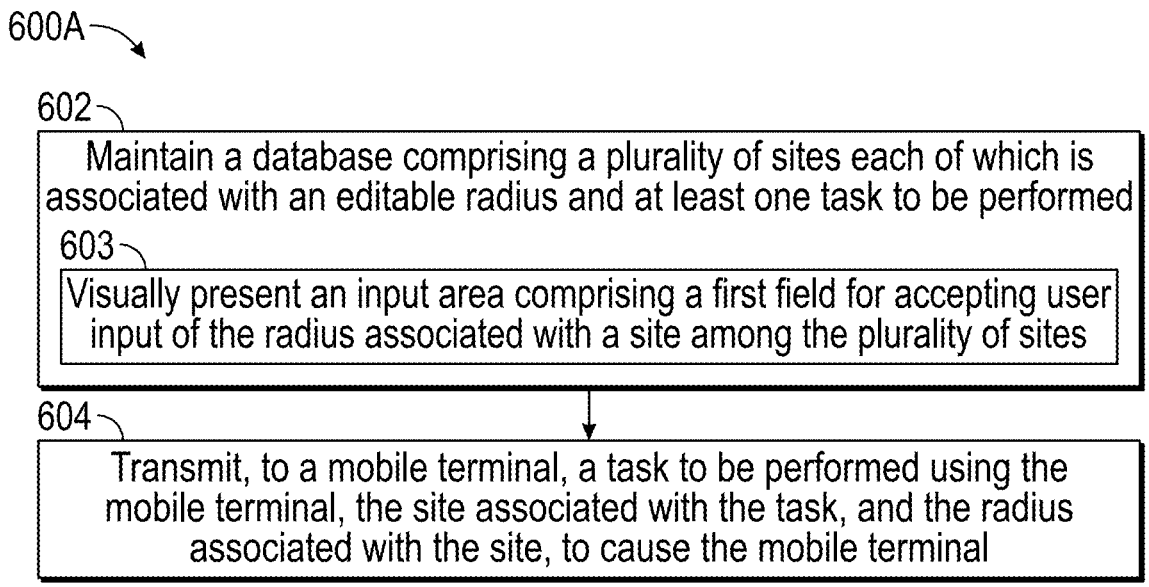
FIGS. 6A-6C are flow charts of various processes, in accordance with some embodiments.

FIG. 6A is a flow chart of a process 600A, in accordance with some embodiments. In at least one embodiment, the process 600A is executed on the system side, e.g., at the server 130.

At operation 602, a database is maintained, and comprises a plurality of sites each of which is associated with an editable radius and at least one task to be performed. For example, a database 200 is maintained at a server 130, as described with respect to FIG. 2.

In some embodiments, operation 602 includes operation 603, at which an input area is visually presented, e.g., in a GUI. The input area comprises a field for accepting user input of the radius associated with a site among the plurality of sites. For example, a radius associated with a site is input or modified by a user through a Radius input area 354 in the GUI 300, as described with respect to FIG. 3B.

At operation 604, a task to be performed using a mobile terminal, the site associated with the task, and the radius associated with the site are transmitted to the mobile terminal. For example, a mobile configuration corresponding to a task is transmitted from the server 130 to a the 140, as described with respect to FIGS. 1, 2, 3A, 4A. The described operations 602-604 include the system side geofencing features of specifying a radius for each site and sending the specified radius to a mobile terminal assigned to perform a task at the site. In at least one embodiment, one or more advantages described herein with respect to geofencing features are achievable by the process 600A.

Figure 6B:
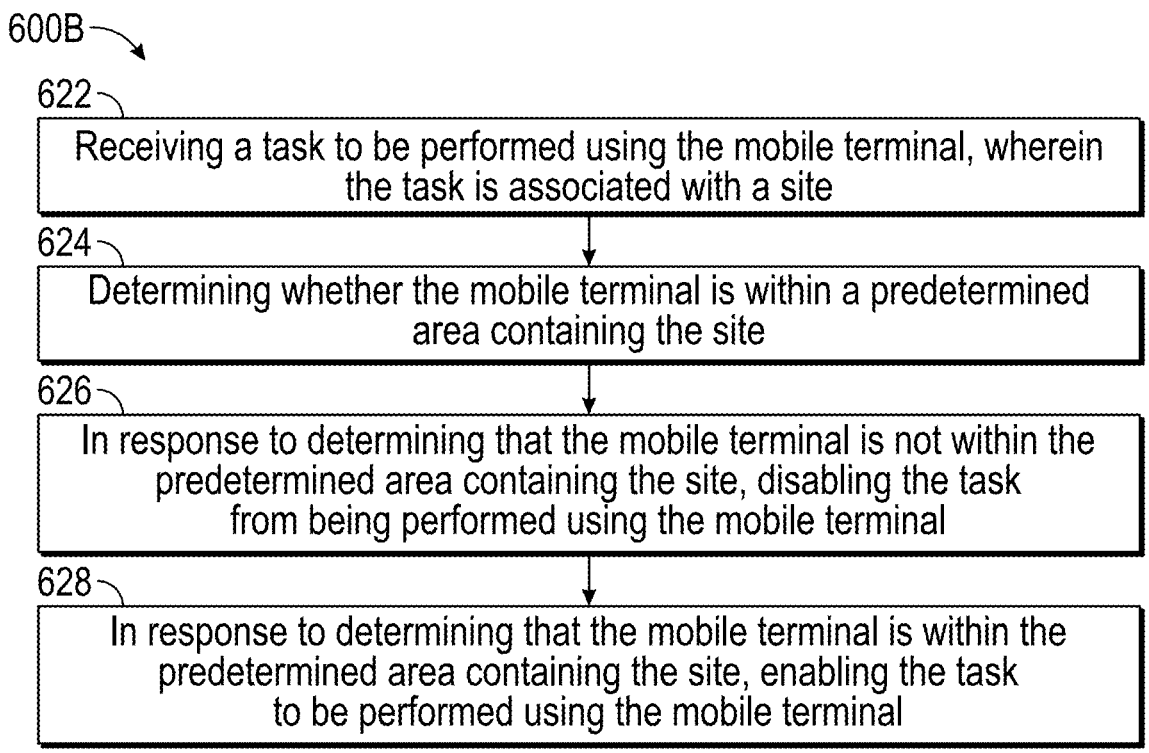

FIG. 6B is a flow chart of a process 600B, in accordance with some embodiments. In at least one embodiment, the process 600B is executed on the user side, e.g., at a mobile terminal, such as one or more of the mobile terminals described with respect to FIGS. 1, 5A, 5C.

At operation 622, the mobile terminal receives a task to be performed using the mobile terminal, wherein the task is associated with a site. For example, the mobile terminal receives one or more tasks with the associated sites, as described with respect to FIG. 4A.

At operation 624, the mobile terminal determines whether the mobile terminal is within a predetermined area containing the site associated with the task. In at least one embodiment, the predetermined area is defined by a radius specified for the site and sent by the server 130 to the mobile terminal, as described with respect to FIGS. 1, 4A. The Equation (1) described herein is an example way for determining a distance between the mobile terminal and the site. The distance is compared with the specified radius associated with the site to determine whether the mobile terminal is within the predetermined area containing the site or not. As described herein, a predetermined area associated with a site may have a shape other than a circle and may be defined by more than one parameters, dimensions, or the like.

At operation 626, in response to determining that the mobile terminal is not within the predetermined area containing the site, the mobile terminal disables the task from being performed using the mobile terminal. For example, the mobile terminal disables the task as described with respect to FIG. 4B.

At operation 628, in response to determining that the mobile terminal is within the predetermined area containing the site, the mobile terminal enables the task to be performed using the mobile terminal. For example, the mobile terminal enables the task as described with respect to FIG. 4C. The described operations 622-628 include the user side geofencing features of using a radius specified for a site to disable or enable the corresponding task, depending on whether the mobile terminal is outside or within the specified radius from the site. In at least one embodiment, one or more advantages described herein with respect to geofencing features are achievable by the process 600B.

Figure 6C:
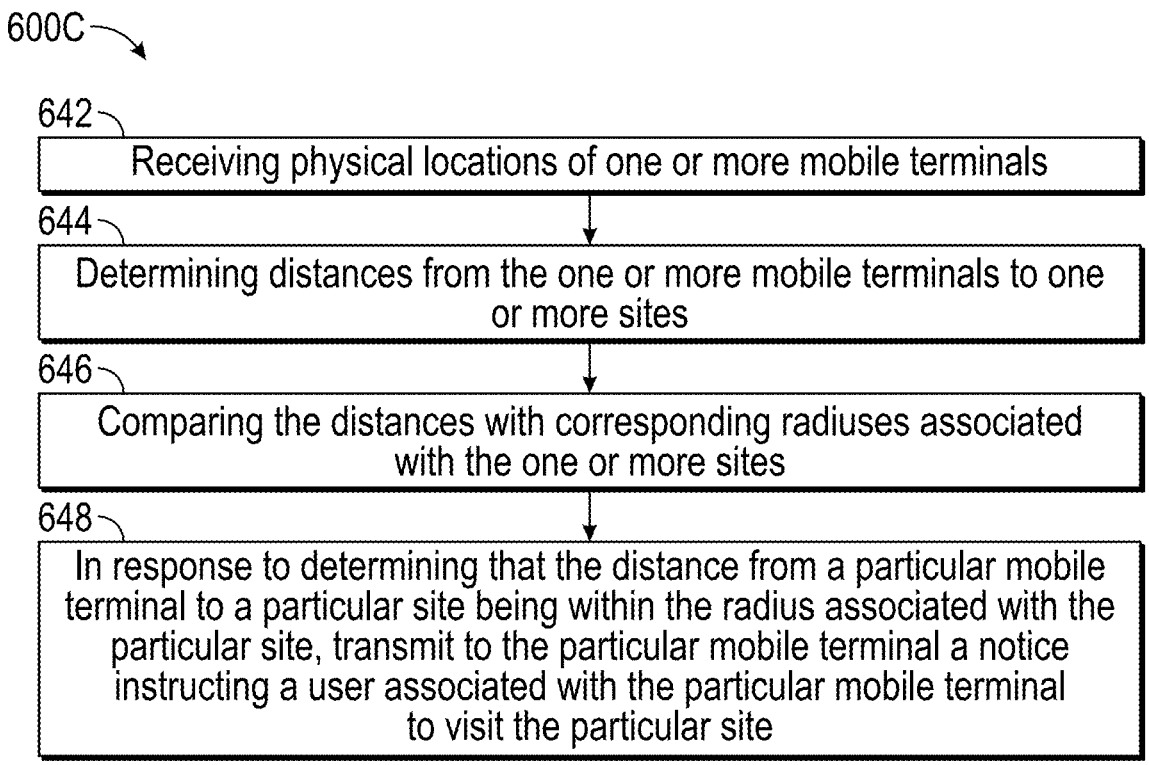

FIG. 6C is a flow chart of a process 600C, in accordance with some embodiments. In at least one embodiment, the process 600C is executed on the system side, e.g., at the server 130.

At operation 642, physical locations of one or more mobile terminals are received. For example, the server 130 periodically receives physical locations of one or more mobile terminals, as described with respect to FIGS. 5A, 5C.

At operation 644, distances from the one or more mobile terminals to one or more sites are determined. For example, a distance between a mobile terminal and a site is determined from the physical locations of the mobile terminal and the site, and by using the Equation (1), as also described with respect to FIGS. 5A, 5C.

At operation 646, the distances are compared with corresponding radiuses associated with the one or more sites, for example, as described with respect to FIGS. 5A, 5C.

At operation 648, in response to determining that the distance from a particular mobile terminal to a particular site being within the radius associated with the particular site, a notice is transmitted to the particular mobile terminal instructing a user associated with the particular mobile terminal to visit the particular site. For example, a notice as described with respect to FIG. 5B is sent to the mobile terminal 542 determined to be within the radius RO associated with the site 501, to instruct the corresponding user 552 to visit the site 501, as described with respect to FIG. 5A. For another example, a notice similar to that described with respect to FIG. 5B is sent to the mobile terminal 540 determined to be within the radius R5 associated with the site 520, to instruct the corresponding user 550 to visit the site 520, as described with respect to FIG. 5C. The described operations 642-648 include geofencing features for automatically assigning users to nearby sites. In at least one embodiment, one or more advantages described herein with respect to geofencing features are achievable by the process 600C.

The described methods and algorithms include example operations, but they are not necessarily required to be performed in the order shown. Operations may be added, replaced, changed order, and/or eliminated as appropriate, in accordance with the spirit and scope of embodiments of the disclosure. Embodiments that combine different features and/or different embodiments are within the scope of the disclosure and will be apparent to those of ordinary skill in the art after reviewing this disclosure.

FIG. 7 is a schematic block diagram of a computer system 700, in accordance with some embodiments. Examples of the computer system 700 include, but are not limited to, desktop, a laptop, a tablet, a smart phone, a server, or the like.

The computer system 700 includes a hardware processor 702 and a non-transitory, computer-readable storage medium 704. Storage medium 704, amongst other things, is encoded with, i.e., stores, computer program code 706, i.e., a set of executable instructions, such as one or more algorithms, programs, applications, sets of executable instructions for a view builder, or the like, as described with respect to one or more of FIGS. 1-8B. Execution of instructions 706 by hardware processor 702 implements a portion or all of the methods described herein in accordance with one or more embodiments (hereinafter, the noted processes and/or methods).

Processor 702 is coupled to non-transitory computer-readable storage medium 704 via a bus 708. Processor 702 is also coupled to an I/O interface 710 by bus 708. A network interface 712 is connected to processor 702 via bus 708. Network interface 712 is connected to a network 714, so that processor 702 and computer-readable storage medium 704 are connectable to external elements or devices via network 714. Processor 702 is configured to execute computer program code 706 encoded in computer-readable storage medium 704 in order to cause computer system 700 to be usable for performing a portion or all of the noted processes and/or methods. In one or more embodiments, processor 702 comprises a central processing unit (CPU), a multi-processor, a distributed processing system, an application specific integrated circuit (ASIC), and/or a suitable hardware processing unit.

In one or more embodiments, computer-readable storage medium 704 comprises an electronic, magnetic, optical, electromagnetic, infrared, and/or a semiconductor system (or apparatus or device). For example, computer-readable storage medium 704 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 704 includes a compact disk-read only memory (CD-ROM), a compact disk-read/write (CD-R/W), and/or a digital video disc (DVD).

In one or more embodiments, storage medium 704 stores computer program code 706 configured to cause computer system 700 to be usable for performing a portion or all of the noted processes and/or methods. In one or more embodiments, storage medium 704 also stores information or data 707, such as event data, consumer data, business data, policies, component configurations or the like, used in a portion or all of the noted processes and/or methods.

I/O interface 710 is coupled to external circuitry. In one or more embodiments, I/O interface 710 includes a keyboard, keypad, mouse, trackball, trackpad, touchscreen, and/or cursor direction keys for communicating information and commands to processor 702. Computer system 700 is configured to receive information through I/O interface 710. The information received through I/O interface 710 includes one or more of instructions, data, policies, configurations and/or other parameters for processing by processor 702. The information is transferred to processor 702 via bus 708. Computer system 700 is configured to receive information related to a user interface through I/O interface 710. The information is stored in computer-readable storage medium 704 as user interface (UI) 742.

Network interface 712 allows computer system 700 to communicate with network 714, to which one or more other computer systems are connected. Network interface 712 includes wireless network interfaces such as BLUETOOTH, WIFI, WIMAX, GPRS, LTE, 5G, 6G, WCDMA, or the like; or wired network interfaces such as ETHERNET, USB, IEEE-864 or the like. In one or more embodiments, a portion or all of noted processes and/or methods, is implemented in two or more computer system 700.

In some embodiments, a portion or all of the noted processes and/or methods is implemented as a standalone software application for execution by one or more hardware processors. In some embodiments, a portion or all of the noted processes and/or methods is implemented as a software application that is a part of an additional software application. In some embodiments, a portion or all of the noted processes and/or methods is implemented as a plug-in to a software application.

In some embodiments, a portion or all of the noted processes and/or methods is realized as functions of a program stored in a non-transitory computer readable recording medium. The non-transitory computer readable recording medium having the program stored therein is a computer program product. Examples of a non-transitory computer-readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, or the like.

The foregoing outlines features of several embodiments so that those skilled in the art better understand the aspects of the present disclosure. Those skilled in the art should appreciate that they readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they make various changes, substitutions, and alterations herein without departing from the spirit and scope of the present disclosure.

What is claimed is:

1. A method for task management, comprising:
   receiving, by a mobile terminal, a task to be performed using the mobile terminal, the task associated with a site;
   determining, by the mobile terminal, whether the mobile terminal is within a predetermined area containing the site;
   in response to determining that the mobile terminal is not within the predetermined area containing the site, disabling, by the mobile terminal, the task from being performed using the mobile termimal, wherein the disabling comprises at least one of prohibiting the mobile terminal from entering data captured by other equipment, prohibiting the mobile terminal from capturing images, or disabling a camera of the mobile terminal; and
   in response to determining that the mobile terminal is within the predetermined area containing the site, enabling, by the mobile terminal, the task to be performed using the mobile terminal.

2. The method of claim 1, further comprising:
   receiving, by the mobile terminal, a radius associated with the site,
   wherein said determining comprises
      in response to a distance between the mobile terminal and the site is greater than the radius, determining that the mobile terminal is not within the predetermined area containing the site, and
      in response to the distance between the mobile terminal and the site is not greater than the radius, determining that the mobile terminal is within the predetermined area containing the site.

3. The method of claim 2, further comprising:
   receiving, by the mobile terminal, a physical location of the site; and
   determining, by the mobile terminal, the distance between the mobile terminal and the site based on the received physical location of the site.

4. The method of claim 3, wherein
   the physical location of the site comprises a longitude and a latitude of the site.

5. The method of claim 1, further comprising:
   visually presenting, by the mobile terminal, a list of tasks to be performed using the mobile terminal,
   wherein said determining is performed in response to user selection of the task from the list.

6. The method of claim 5, wherein
   said disabling comprises visually presenting, by the mobile terminal, a notice indicating that the selected task is disabled from being performed.

7. The method of claim 6, wherein
   the notice indicates a physical distance between the mobile terminal and the site.

8. The method of claim 1, wherein
   said enabling comprises enabling the mobile terminal to perform at least one of
      capturing a picture required by the task and associated with the site,
      performing a measurement required by the task and associated with the site, or
      receiving user input of data required by the task and associated with the site.

9. The method of claim 1, wherein
   enabling the task comprises executing, by the mobile terminal, a module corresponding to the task.

10. A system for task management, comprising at least one processor and at least one memory coupled to the at least one processor and configured to store executable instructions that, when executed by the at least one processor, cause the at least one processor to:
    maintain a database comprising a plurality of sites each of which is associated with an editable radius and at least one task to be performed, and
    transmit, to a mobile terminal, a task to be performed using the mobile terminal, the site associated with the task, and the radius associated with the site, to cause the mobile terminal to
       determine whether the mobile terminal is within the radius from the site,
       in response to determining that the mobile terminal is not within the radius from the site, disable the task from being performed using the mobile terminal, wherein the disabling comprises at least one of prohibiting the mobile terminal from entering data captured by other equipment, prohibiting the mobile terminal from capturing images, or disabling a camera of the mobile terminal, and
       in response to determining that the mobile terminal is within the radius from the site, enable the task to be performed using the mobile terminal.

11. The system of claim 10, wherein the executable instructions, when executed by the at least one processor, further cause the at least one processor to:
    transmit, to the mobile terminal, a physical location of the site.

12. The system of claim 11, wherein
    the physical location of the site comprises a longitude and a latitude of the site.

13. The system of claim 10, wherein the executable instructions, when executed by the at least one processor, further cause the at least one processor to:

visually present an input area comprising a first field for accepting user input of the radius associated with a site among the plurality of sites.

14. The system of claim 13, wherein
the input area further comprises at least one of:
a second field for accepting user input of an identification of the site, or
a third field for accepting user input of a module corresponding to a task associated with the site, the module to be executed by a mobile terminal for performing the task.

15. The system of claim 10, wherein the executable instructions, when executed by the at least one processor, further cause the at least one processor to visually present:
a list of tasks each of which comprises:
a site associated with the task,
the radius associated with the site, and
a module corresponding to the task, the module to be executed by a mobile terminal for performing the task, and
a menu item for adding a new task.

16. The system of claim 15, wherein the executable instructions, when executed by the at least one processor, further cause the at least one processor to:
in response to user selection of (a) a task in the list or (b) the menu item, visually present an input area comprising a field for accepting user input of (a) an edited radius for the site associated with the selected task or (b) a new radius for a site associated with the new task to be added.

17. The system of claim 10, wherein the executable instructions, when executed by the at least one processor, further cause the at least one processor to:
receive a physical location of the mobile terminal,
determine, based on the physical location of the mobile terminal and physical locations of the plurality of sites, distances from the mobile terminal to the plurality of sites,
compare the distances from the mobile terminal to the plurality of sites with the radiuses associated with the plurality of sites, and
in response to the distance from the mobile terminal to a particular site among the plurality of sites being within the radius associated with the particular site, transmit to the mobile terminal a notice instructing a user associated with the mobile terminal to visit the particular site.

18. The system of claim 10, wherein the executable instructions, when executed by the at least one processor, further cause the at least one processor to:
receive physical locations of a plurality of mobile terminals,
determine, based on the physical locations of the plurality of mobile terminals and a physical location of a particular site among the plurality of sites, distances from the plurality of mobile terminals to the particular site,
compare the distances from the plurality of mobile terminals to the particular site with a radius associated with the particular site, and
in response to the distance from a particular mobile terminal among the plurality of mobile terminals to the particular site being within the radius associated with the particular site, transmit to the particular mobile terminal a notice instructing a user associated with the particular mobile terminal to visit the particular site.

19. A computer program product for task management, comprising a non-transitory, tangible computer readable storage medium storing a computer program that, when executed by at least one processor, causes the at least one processor to:
visually present a list of tasks to be performed at corresponding sites using a mobile terminal,
in response to user selection of a task from the list, determine whether the mobile terminal is within a predetermined radius from the site corresponding to the selected task,
in response to determining that the mobile terminal is not within the radius from the corresponding site, disable the selected task from being performed using the mobile terminal, wherein the disabling comprises at least one of prohibiting the mobile terminal from entering data captured by other equipment, prohibiting the mobile terminal from capturing images, or disabling a camera of the mobile terminal, and
in response to determining that the mobile terminal is within the radius from the corresponding site, enable the selected task to be performed using the mobile terminal.

20. The computer program product of claim 19, wherein the computer program, when executed by the at least one processor, further causes the at least one processor to
in response to determining that the mobile terminal is not within the radius from the corresponding site, visually present a notice indicating a physical distance between the mobile terminal and the site corresponding to the selected task which is disabled from being performed using the mobile terminal.

* * * * *